Jan. 29, 1924. Re. 15,752

J. COULTER

CHAIN LINK

Original Filed Nov. 14, 1921

INVENTOR.
James Coulter
BY
G. H. Braddock
ATTORNEY.

Reissued Jan. 29, 1924. Re. 15,752

UNITED STATES PATENT OFFICE.

JAMES COULTER, OF BRIDGEPORT, CONNECTICUT.

CHAIN LINK.

Original No. 1,435,700, dated November 14, 1922, Serial No. 514,959, filed November 14, 1921. Application for reissue filed August 29, 1923. Serial No. 660,053.

*To all whom it may concern:*

Be it known that I, JAMES COULTER, a citizen of the United States, residing at the city of Bridgeport, in the county of Fairfield and State of Connecticut, have invented certain new and useful Improvements in Chain Links; and I do declare the following to be a full, clear, and exact description of the invention, such as will enable others skilled in the art to which it appertains to make and use the same.

This invention relates to certain new and useful improvements in chain links, and the object of the invention is to provide a chain link wherein the double eyes at one end of the bow portion thereof are formed of an intermediate part of the piece of wire and wherein the bow portion is formed of the end portions of said wire which latter are joined together and preferably welded so as to greatly strengthen and reinforce the bow portion.

Figure 1:
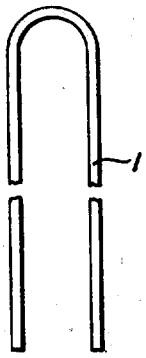
Fig. 1 is an elevation of the blank in the first step of making the link.
Figure 2:
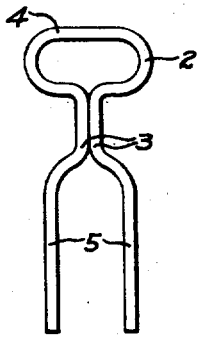
Fig. 2 is a like view in the second step.
Figure 3:
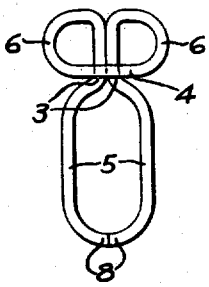
Fig. 3 is a like view in the third step.
Figure 4:
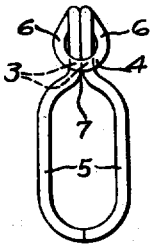
Fig. 4 is a front elevation of the completed link.
Figure 5:
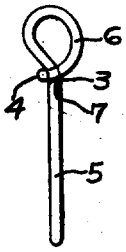
Fig. 5 is a side elevation of Fig. 4.

In proceeding in accordance with the present invention, one method which attains the object sought, resides in first forming the wire 1 into a U-shape as depicted at Fig. 1, following which the blank is then shaped to afford an elongated loop 2 with contracted or neck portions 3 that lie between the loop and the side wires 5 as shown in Fig. 2. The blank is then operated upon so as to fold or bring the cross wire 4 of the loop 2 in a position to extend transversely across the neck portion 3 at the bases of the latter. This step results in forming twin or double eyes 6, the structure being next shaped to fold or bend the eyes 6 rearwardly so that they lie in abutting engagement in which position the wire 4 extends across the eyes at their bases where they adjoin the inner end portion 7 of the bow, as depicted in Figs. 4 and 5 of the drawings. In the preferred form of the link, the final step resides in welding the free ends 8 of the blank together at the outer end of the bow portion. This may be accomplished in a variety of ways. For example, as depicted in Fig. 3, the ends may be made flat and brought into abutting engagement and then welded to produce the structure of Fig. 4, or, as shown in Fig. 6, ends 9 are lapped only a short distance so that when the welding occurs the swaging dies will squeeze the softened metal into substantially the shape shown at Fig. 7, in which it will be observed that the cross bar portion 8 at the outer end of the link is strengthened at 10.

Figure 8:
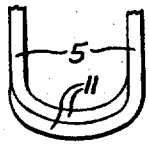
Figs. 8 and 9 are views similar to Figs. 6 and 7 showing another way of welding the blank ends.
Figure 9:
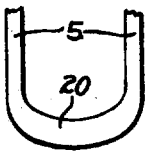

The preferred way is to lap the ends in the manner shown at Fig. 8 where there are comparatively long laps 11, so that the completed chain will be substantially as is shown at 20 in Fig. 9 in which it will be observed that not only the cross bar portion but the corner portions, where the cross bar joins the side wires of the bow, are greatly strengthened and reenforced.

Figure 6:
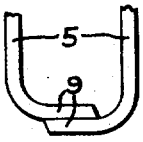
Fig. 6 is a fragmentary elevation showing one way in which the ends of the blank may be welded together.
Figure 7:
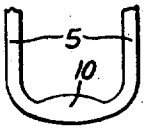
Fig. 7 is a like view showing the weld completed.
Figure 10:
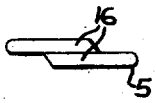
Fig. 10 is an end elevation of a further view of welding the blank ends.
Figure 12:
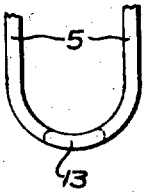
Fig. 12 is a side elevation of a still further form of weld.
Figure 13:
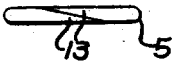
Fig. 13 is an end elevation of Fig. 12.
Figure 14:
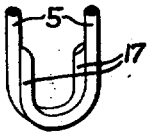
Fig. 14 is a fragmentary perspective view of another form of weld.

In Figs. 6 and 8, it will be observed that the terminal ends of the bow are overlapped one inside the other, but, prior to the welding, these ends may be overlapped, one alongside the other, the ends being, of course, sheared off in all instances as shown in the drawings, and these ends can be lapped alongside of each other only a short distance as shown at 16, Fig. 10, in which instance the result of the welding would be as is shown at Fig. 7, or these ends can be lapped alongside of each other as is shown by forming the ends into J-shape as illustrated at 17 in Fig. 14 in which instance the result of the welding would be as is shown at Fig. 9. At Figs. 12 and 13, the ends of the wire terminate at the bow end of the link and are sheared at an angle, and said ends prior to welding, are lapped against each other laterally so as to present no increase in the cross sectional area of the bow end, the lapped portions being denoted by the numeral 13.

Figure 11:
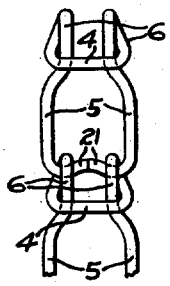
Fig. 11 is a front elevation of a form of link such as may be preferred when welding is omitted.

In some forms of wire chain resistance to tensile strains is not especially necessary, and therefore the welding operation above noted becomes unnecessary. In Fig. 11 is illustrated a form of such chain in which the eyes 6 are spaced apart, the wire 4 extending across the bases of these eyes at the point where the latter adjoin the inner end of the bow portion in the manner above noted. But the extremities of the wire forming the link are merely abutted together at the outer end of the bow portion, and these extremities are preferably bent inwardly so as to form complementary arch portions 21, and in this connection it will be clear that the end of this bow portion is greatly strengthened by the arch formation.

This sort of chain is serviceable for use as "ladder chain" or conveyor chain both of which styles of chain are well known commercial products.

In all forms of the invention it will be seen that the twin eyes are formed integral or of continuous construction, while the bow portion is formed of the terminal or end portions of the wire, said end portions being joined to complete the bow formation. Obviously, the manners of joining said end portions as illustrated and described are merely to clarify the principles of the invention. These may be joined in any manner, and evidently, need not be joined at the outer end of the bow.

The above described method of making the structure is but illustrative of one way which may be followed and obviously various or different ways may be employed, the invention not being limited to any particular method.

What is claimed is:

1. In a chain link, a length of wire formed intermediate its ends with a pair of eyes and with an integral cross part which extends across the base of each eye, the wire beyond the cross part having its end portions shaped to form a bow.

2. In a chain link, a length of wire formed intermediate its ends with a pair of eyes and with an integral cross part which extends across the base of each eye, the wire beyond the cross part being shaped to form a bow with the cross part extending across the bases of the eyes adjacent the inner end of the bow, and the end portions of the wire being joined together.

3. In a chain link, a piece of wire formed intermediate its ends with a pair of eyes and with an integral cross part connecting the eyes and extending across the base of each eye, the wire beyond the cross part and eyes having its end portions shaped to form a bow.

4. In a chain link, a piece of wire formed intermediate its ends with a pair of eyes and with an integral cross part which extends across the base of each eye, the wire beyond the cross part being shaped to form a bow with the cross part extending across the bases of the eyes adjacent the inner end of the bow, and the end portions of the wire being joined together.

5. In a chain link a piece of wire formed intermediate its ends with a pair of eyes and with an integral cross part connecting said eyes, the end portions of the wire beyond said cross part being joined to each other and shaped to form a bow.

6. In a chain link, a piece of wire formed intermediate its ends with a pair of abutting eyes and with an integral cross part which extends across the base of each eye, the wire beyond the cross part being shaped to form a bow with the cross part extending across the bases of the eyes adjacent to the inner end of the bow, the ends of the wire being abutted together and shaped to form the outer end of the bow.

7. In a chain link, a piece of wire formed intermediate its ends with a pair of eyes and with a cross member and a bow, the cross-member being disposed between the inner end of the bow and the bases of the eyes and the ends of the wire being bent and welded together to form the outer end of the bow.

8. A wire chain link comprising integral twin eyes formed therein at points intermediate the ends of the wire and having an integral part of the wire extending transversely across the inner ends of the eyes, the wire ends being shaped to form the sides of the bow and the terminals of the wire being bent and welded together to form the outer end of the bow.

9. A wire chain link comprising integral twin eyes formed therein at points intermediate the ends of the wire and having the latter shaped to form the sides of a bow with the eyes at the inner end of the latter and the terminals of the wire being bent and welded together to form the outer end portion of the bow.

10. A wire chain link comprising integral twin eyes formed therein at points intermediate the ends of the wire and having the eyes parallel and at one end of the bow, and the terminals of the wire being bent and abutted together to form the outer end portion of the bow.

Signed at Bridgeport, in the county of Fairfield, and State of Connecticut, this 25th day of August, 1923.

JAMES COULTER.